US008634706B2

(12) United States Patent
Minnick et al.

(10) Patent No.: US 8,634,706 B2
(45) Date of Patent: Jan. 21, 2014

(54) METHOD AND APPARATUS FOR RECEIVING, STORING, AND PRESENTING MULTIMEDIA PROGRAMMING WITHOUT INDEXING PRIOR TO STORAGE

(75) Inventors: Danny Jean Minnick, Littleton, CO (US); Michael Cavanaugh, Englewood, CO (US); Mark Templeman, Englewood, CO (US); John D. Hamrick, Jr., Englewood, CO (US); Jay P. Carlson, Englewood, CO (US); Yunfeng Yang, Englewood, CO (US); Manuel Novoa, III, Highlands Ranch, CO (US); Rui Ding, Aurora, CO (US); Seth Byerley, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 567 days.

(21) Appl. No.: 12/906,894

(22) Filed: Oct. 18, 2010

(65) Prior Publication Data

US 2011/0035517 A1 Feb. 10, 2011

Related U.S. Application Data

(62) Division of application No. 11/512,583, filed on Aug. 29, 2006, now Pat. No. 7,826,712.

(51) Int. Cl.
*H04N 5/91* (2006.01)
*H04N 5/92* (2006.01)

(52) U.S. Cl.
USPC .......................................... 386/326; 386/247

(58) Field of Classification Search
USPC .................. 386/326, 323, 324, 322, 341, 247
See application file for complete search history.

(56) References Cited

U.S. PATENT DOCUMENTS 5,377,051 A 12/1994 Lane et al. .................... 360/33.1
5,541,738 A 7/1996 Mankovitz ..................... 358/335

(Continued)

FOREIGN PATENT DOCUMENTS

JP 2006-101229 A 4/2006
WO WO 97/19552 5/1997
WO WO 97/19552 A2 5/1997

OTHER PUBLICATIONS

"Second Office Action" issued by the China State Intellectual Property Office on Nov. 5, 2010 in Chinese application No. 200780032284.0, 2 pages, english translation included.

(Continued)

*Primary Examiner* — Robert Chevalier
(74) *Attorney, Agent, or Firm* — Seed IP Law Group PLLC

(57) ABSTRACT

A method and apparatus for improved digital recording and presentation of broadcast information is disclosed. Received broadcast data, which may include video, audio, private, or other data, relating to one or more particular content programs, is presented from an input section to a buffer and recorded directly onto a storage device without any intelligent parsing, such as indexing, and without any manipulation by intermediate hardware or software functions. Upon normal presentation, statistics may be generated to determine the ideal number of frames to skip, the number of bytes to seek, and the size of data files to read from the storage device during time-shifted presentation. Algorithms and processes are provided to dynamically optimize time-shifted presentation. In this way, data may be captured to the storage device more efficiently and economically, and the time-shifted presentation operations may be performed in a smoother, more nuanced manner with the application of appropriate probabilistic algorithms.

16 Claims, 6 Drawing Sheets

(56) References Cited

U.S. PATENT DOCUMENTS

| | | | | |
|---|---|---|---|---|
| 5,577,190 | A | 11/1996 | Peters | 395/501 |
| 5,614,940 | A | 3/1997 | Cobbley et al. | 348/7 |
| 5,659,539 | A | 8/1997 | Porter et al. | 395/200.61 |
| 5,949,948 | A | 9/1999 | Krause et al. | 386/6 |
| 5,956,716 | A | 9/1999 | Kenner et al. | 707/10 |
| 5,991,502 | A | 11/1999 | Kawakami et al. | 386/109 |
| 6,167,083 | A | 12/2000 | Sporer et al. | 375/240.01 |
| 6,233,389 | B1 | 5/2001 | Barton et al. | 386/46 |
| 6,304,714 | B1 | 10/2001 | Krause et al. | 386/52 |
| 7,826,712 | B2 | 11/2010 | Minnick et al. | 386/69 |
| 2005/0286563 | A1* | 12/2005 | Hong | 370/488 |

OTHER PUBLICATIONS

Office Action issued by the China State Intellectual Property Office in PRC (China), Patent Application No. 200780032284.0, on Jun. 10, 2010.

Office Action issued by the Korean Intellectual Property Office, Patent Application No. 10-2009-7004103, on Aug. 3, 2010, 7 pages.

Official Action issued by the European Patent Office, Patent Application No. 07 811 582.1-1247, on Oct. 9, 2009, 7 pages.

Singapore Written Opinion issued by the Danish Patent and Trademark Office, Patent Application No. 200901081-0, Feb. 25, 2010, 9 pages.

Examiner's First Report on Patent Application Serial No. 2007290544, issued by the Australian Government, IP Australia, on Feb. 9, 2010, 2 pages.

Extended European Search Report, mailed Jan. 19, 2012, for EP11183883.5, 6 pages.

Notice of Rejection Ground for JP Patent Application No. 2009-526687 mailed Nov. 29, 2011 (with English translation).

* cited by examiner

METHOD AND APPARATUS FOR RECEIVING, STORING, AND PRESENTING MULTIMEDIA PROGRAMMING WITHOUT INDEXING PRIOR TO STORAGE

RELATED APPLICATIONS

This application is a divisional application of U.S. patent application Ser. No. 11/512,583, entitled "Method and Apparatus for Receiving, Storing, and Presenting Multimedia Programming without Indexing Prior to Storage", filed Aug. 29, 2006, which is hereby incorporated herein by reference in its entirety.

FIELD OF THE INVENTION

The present disclosure relates to a method and apparatus for improved digital recording and presentation of broadcast information. Specifically, the present disclosure relates to a method and apparatus for receiving, storing, and presenting broadcast information in real-time and time-shifted modes of operation.

BACKGROUND OF THE INVENTION

Digital data recorders, such as digital video recorders (DVRs) have been known since at least 1992. Standard DVRs permit users to record broadcast information to a storage device for later playback. Typically, DVRs enable time-shifted (trick-play) modes of operation that are similar to functions found on video cassette recorders, with which most users are familiar. For example, DVRs may have functions such as "pause," "rewind," "fast-forward," "skip," and "slow motion." One of the first commercially available DVRs was the MediaStream system developed and marketed by Media4, now part of EchoStar Communications Corporation. In April 1996, Media4 introduced the MediaStream receiver, which was a Digital Video Broadcasting-compliant satellite receiver system with integrated DVR functions. The MediaStream system was designed to both record and present programs simultaneously, allowing one program to be both recorded and presented. The MediaStream receiver system demultiplexed a Moving Picture Experts Group (MPEG) transport stream that contained one or more television programs, for example, and filled separate video packetized elementary stream (PES) and audio PES buffers. The data contained in the buffers was written to disk for later playback in either normal or trick-play mode. The MediaStream system did no intelligent parsing of the input to generate an index to aid in trick-play modes of operation, but merely performed a "brute-force" search of data stored on the hard disk when performing those functions.

Many methods and systems have been developed for creating indices by intelligently parsing broadcast input streams and using index information generated during input to later find and play back appropriate frames of data. One of the earliest of these systems is described in two patents assigned to Imedia Corporation, U.S. Pat. Nos. 5,949,948 and 6,304,714, both to Krause et al. These patents disclose a set-top DVR system for simultaneous presentation and recording of compressed digital data. For example, U.S. Pat. No. 5,949,948 discloses a start-code detector for detecting the beginning of video I-frames in an MPEG data stream, an indexing system that correlates I-frames with addresses in memory, and a trick-play system that searches the index information to determine which frames to play back in trick-play operations. Similarly, U.S. Pat. No. 5,614,940, to Cobbley et al., of Intel, discloses a set-top system that can convert broadcast information to a digital format, generate during input various index data relating to the content of the broadcast information, store both the compressed broadcast data and the related index data, and then retrieve the broadcast data for playback (in normal or trick-play mode) based upon the corresponding index information. Similar, front-end, input-side intelligent parsing and index-based searching methods are disclosed in U.S. Pat. No. 5,956,716 to Kenner, et al., U.S. Pat. No. 5,659,539 to Porter, et al., U.S. Pat. No. 6,167,083 to Sporer, et al., and U.S. Pat. No. 5,577,190 to Peters.

A later recording system, developed at TiVo Inc. and described in the specification of U.S. Pat. No. 6,233,389, to Barton, et al., also employed a specific type of intelligent parsing/indexing during input and prior to storage of the broadcast information on a storage device. The system described in that patent employs a special circuit called a "Media Switch" that generates indices and fills separate appropriate buffers with specific data. The disclosed "Media Switch" mediates between the central processing unit (CPU), storage device, and memory and thus off-loads the intensive index-based processing of the input stream from the CPU to a separate device. Also in the Barton, et al., system, a software "source object" converts the data into data streams and fills a buffer that is assigned by a central software "transform object" that is responsible for overall control of buffer assignment. The software "transform object" then writes the data to a hard disk. The software "transform object" is also responsible for reading data from the hard disk, filling buffers with the data, and assigning the filled buffers to a software "sink object" for later decoding and playback.

These earlier systems may be inefficient and overly complicated in some operational settings. Such systems require intensive processing during input of the entire set of broadcast data. Given the high throughput required for modern DVR functions, the processing power required during input in such systems may tax the CPU or, in the case of the system of Barton, et al., require specialized hardware and software. Moreover, since much of what is recorded will not be played back in anything other than standard mode, the processing power required, and the memory required to store related index information, may be largely wasted. A more robust, cheaper, and less complicated system is needed.

BRIEF SUMMARY

The methods and systems described herein improve upon prior methods and systems for receiving broadcast data by eliminating unnecessary parsing, separating, transforming or other processing functions before program data is stored on a storage device, and by utilizing instead statistical and probabilistic algorithms to search for and keep track of the program data when presenting such data form the storage device.

The present disclosure provides methods and systems for efficient input handling of broadcast data and dynamic output processing of the broadcast data in trick-play modes. This is achieved by eliminating intelligent processing of input data and, instead, writing data presented by a physical data source directly to the storage device using an asynchronous, single buffer read/write process, and upon invocation of trick-play modes of operation, performing search operations based upon statistics or dynamically generated during presentation operations or received with the broadcast data. Upon normal presentation, statistics may be generated to determine the ideal number of frames to skip, the number of bytes to seek, and the size of data files to read from storage during trick-play operation.

Also described herein are algorithms and operations for dynamically determining any required skip, seek, and read values so as to minimize the use of system resources. In this way, data may be captured to the storage device more efficiently and economically, and the trick-play operations can easily be performed in a smoother, more nuanced manner with the application of appropriate probabilistic algorithms.

Other features and advantages of the methods and systems described herein will become apparent from the following detailed description, when it is considered in conjunction with the accompanying drawings.

BRIEF DESCRIPTION OF THE DRAWING FIGURES

DETAILED DESCRIPTION

As a general matter, it is understood that "intelligent analysis," "intelligent parsing" or "indexing" of an MPEG transport stream means analyzing the stream to extract information contained in the video or audio packets broadcasted for the purposes of associating video- or audio-specific information, such as frame presentation time information, with system-specific information, such as position in a stored data file.

The following description sets forth numerous examples of methods and systems described herein for the storage and presentation of multimedia programming, without the need for indexing prior to storage. It should be recognized, however, that such description is not intended as a limitation on the scope of the present invention, but is instead provided as a description of exemplary embodiments.

I. System for Presentation and Storage

Figure 1:
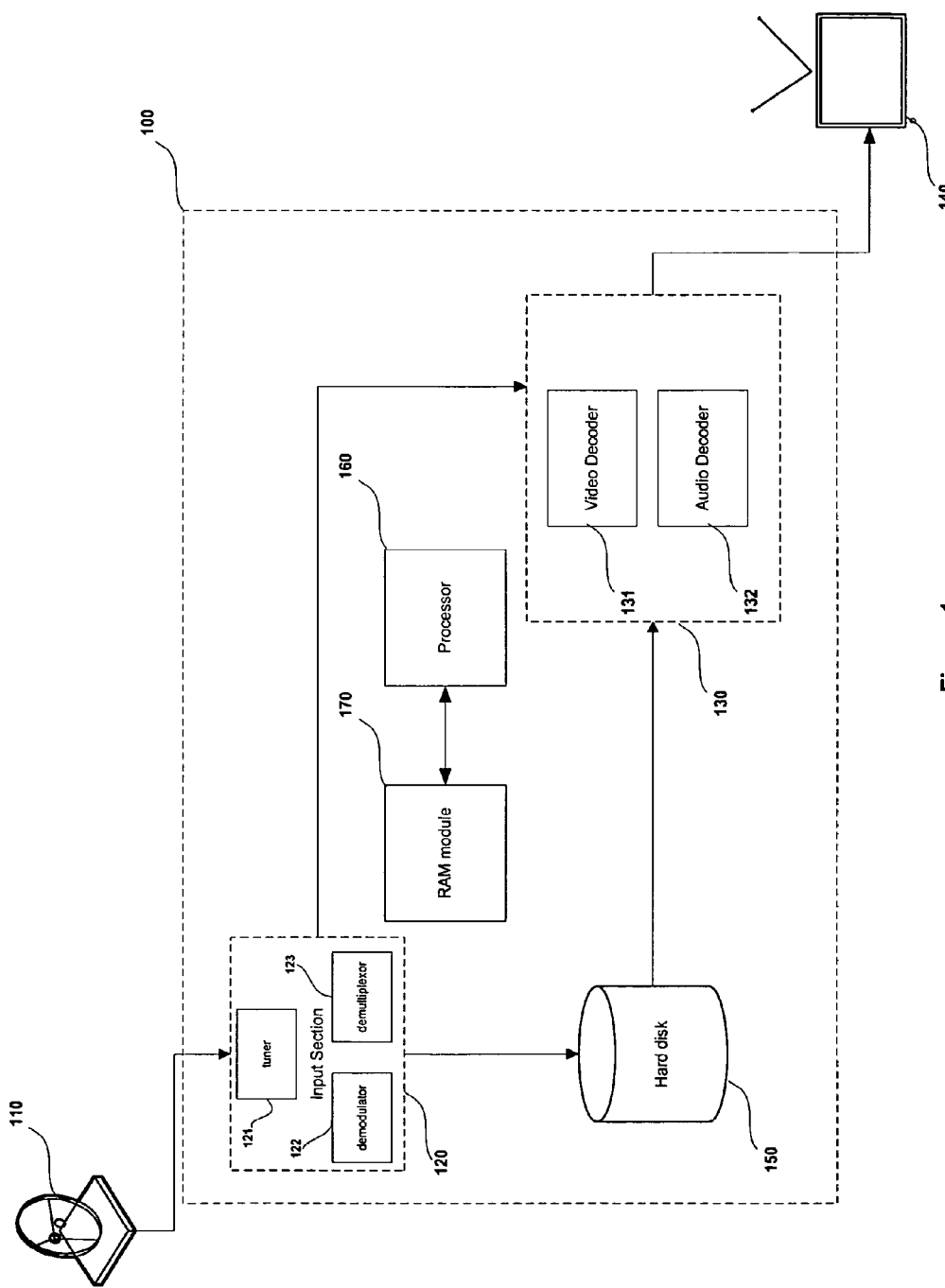
FIG. 1 is a block diagram illustrating a DVR system described herein.

With reference to FIG. 1, a digital video recorder (DVR) embodiment 100 receives an encrypted, scrambled or clear broadcast signal from a direct broadcast satellite (DBS) system through satellite receiver 110. In alternate embodiments, additional or different broadcasting sources and formats may be used such as off-air or terrestrial transmissions, or cable television (TV). Typically, the broadcast signals are television or other multimedia programming signals. The signals may be high definition (HD) television, standard definition (SD) television, audio-only signals or other signals. Such a signal may contain numerous frequency bands of data, with each band containing numerous TV content programs (e.g., CNN®, HBO®, etc.). In a preferred embodiment, the signal received from receiver 110 contains multimedia programming transmitted as an MPEG transport stream, though alternate formats, such as analog TV formats, may be used. An MPEG transport stream (transport stream) contains packets of video-only, audio-only, or other data. Each packet may have associated header information, including packet identification (PID) information. PID information may identify the data type of the packet (video, audio, other) and the content programming associated with the packet, as well as other information. Video and audio packets encoded in the transport stream may also contain presentation timestamp (PTS) data that allows for synchronization of the packets. The packets may also contain start code data that identifies the beginning of a video or audio frame.

Broadcast multimedia programming is received at receiver 110 and forwarded to input section 120 of DVR 100. The signal may be a modulated broadcast signal spanning a broadcast frequency band. Receiver 110 may translate the signal it receives to an intermediate frequency before forwarding it to DVR 100. Tuner 121 of section 120 tunes the signal received from receiver 110 to a frequency range (channel) that contains content programming of interest. Input section 120 may also contain a demodulator 122 that demodulates the broadcast signal to produce a demodulated transport stream. Section 120 may also contain a demultiplexor 123 that filters the transport stream according to programming-specific PID's to produce a transport stream that contains only packets associated with the content programming of interest. In one embodiment, demultiplexor 123 may produce a separate video-only packetized elementary stream (PES) and a separate audio-only PES stream. In another embodiment, a single transport stream is produced with interleaved video and audio data. Demultiplexor 123 may also filter out the other (e.g., non-video and non-audio) data packets for use in DVR 100. Input section 120 may also perform additional functions such as error correction, descrambling, decryption, analog-to-digital conversion or a number of other basic signal processing functions.

The MPEG transport stream outputted from section 120 may be routed to a display section 130 for immediate presentation in real time. Display section 130 contains at least an MPEG video decoder 131 and an MPEG audio decoder 132. Display section 130 may further contain digital-to-analog converters, encoders, additional decoders, video or audio filters, and/or memory buffers, as needed for delivery to a television 140 or other display device.

The MPEG transport stream outputted from section 120 may also be routed to a storage device, such as hard disk 150, for later presentation or for presentation in other than real time. In a preferred embodiment, program logic uses a single buffer for transfer to hard disk 150, without the use of additional buffers. Preferably, the transport stream received from section 120 is written onto hard disk 150, without first analyzing or indexing MPEG video and/or audio frame information, as an MPEG transport stream file (TSP file). In another embodiment, the MPEG information is stored as a PES file or other suitable file format. By doing so, the MPEG transport stream is efficiently stored for later use without employing significant system resources. Time sequence, PTS, start code or other embedded MPEG frame information need not be analyzed, indexed or otherwise correlated with system-specific information, such as TSP file position, prior to storage. Separate TSP files may be maintained for each separately recorded content program or for each separate recording session. Hard disk 150 is connected to display section 130 to provide both contiguous and non-contiguous presentation of any content program stored as a TSP file on hard disk 150. Section 120 is capable of simultaneously outputting to both display section 130 and hard disk 150 for simultaneous storage and presentation of content programming.

DVR 100 also includes at least one processor 160 and at least one system RAM module 170. Program logic, such as record logic, normal playback logic or trick playback logic necessary for the operation of DVR 100 may be executed on processor 160 in conjunction with RAM module 170. In alternate embodiments, separate processors and separate RAM modules may be employed for the functions of input, storage, display, and/or other functions of DVR 100. In one embodiment, DVR 100 is a system operating on a Linux operating system. In alternate embodiments the DVR may be a system operating on a UNIX, Windows, Mac OS, or other operating system. DVR 100 may comprise multiple input sections, display sections, storage devices, processors and RAM modules. In this way, DVR 100 may accommodate a number of signal sources and display and record a number of content programs, simultaneously or separately.

For additional descriptions of digital video recorder systems, see U.S. patent application Ser. No. 10/655,703, filed Sep. 5, 2003, U.S. patent application Ser. No. 10/940,107, filed Sep. 13, 2004, and U.S. patent application Ser. No. 10/940,078, filed Sep. 13, 2004, all of which are hereby incorporated by reference in their entireties for all purposes.

II. Storage Operations

In one embodiment, the recording program logic operates using a single memory buffer, having a fixed memory address that can be accessed asynchronously by both a record driver and a record thread application. This single buffer, also referred to as a record buffer, is filled by a record driver. The data in the single buffer is then moved in a single operation from the single buffer to hard disk 150 by a record thread application. Preferably, recording program logic is not flow controlled and the record driver and the record thread application write or read to or from the single buffer independently, without either application having control over the other. More preferably, the single record buffer is a circular buffer. Use of a single buffer eliminates the need for transfer between two or more separate buffers, which may conserve processor and other system resources. A single buffer method may further increase system efficiency by eliminating the need for communication between a record driver and a record thread application. Preferably, DVR 100 employs one record driver and one record thread application for each tuner in the DVR.

Figure 2:
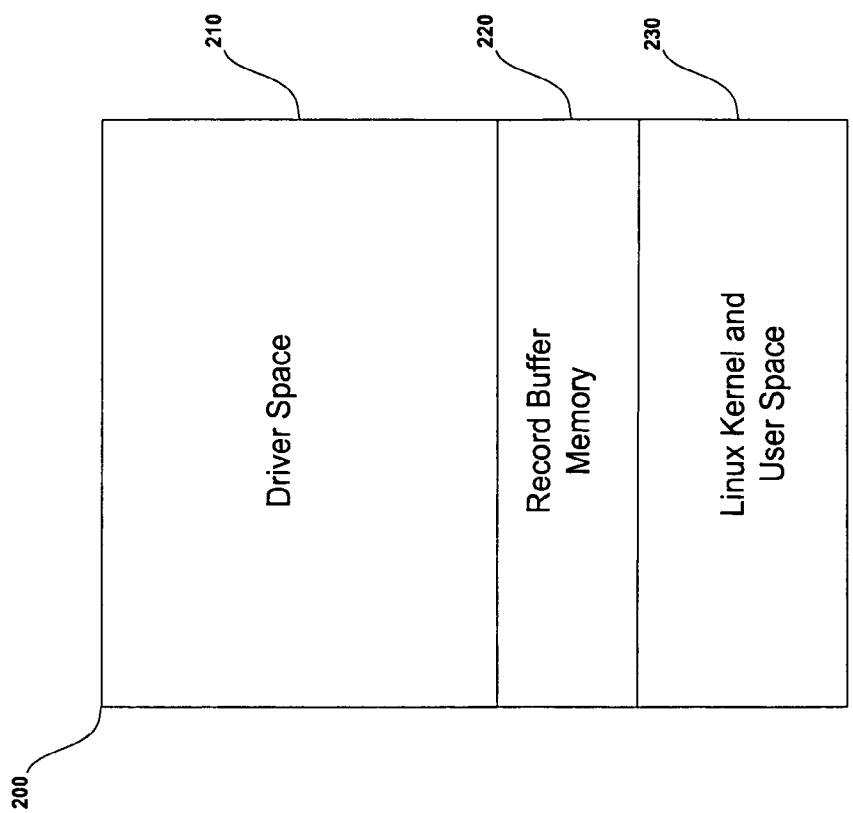
FIG. 2 is a block diagram of the memory allocation in a DVR system described herein.

FIG. 2 is the system memory allocation in one embodiment of DVR 100. System drivers, including the record driver(s), may occupy driver space 210. Single buffer memory 220 is reserved by the Linux kernel at system startup. In a preferred embodiment, single buffer memory 220 is assigned a fixed memory address during each system startup. System memory also contains a Linux kernel and user space 230 that may contain a playback buffer or other user-specific elements. In one embodiment, the Linux kernel reserves a fixed address for memory 220. Single buffer memory 220 may be logically divided into one or more transport buffers (not shown). In a preferred embodiment having fixed memory addresses for single buffer memory 220, the record driver(s) in the driver space 210 calculates a transport buffer memory address using a hard-coded offset from the top of the kernel memory. The hard-code offset is determined by the high_memory symbol exported by the Linux kernel in space 230. The record thread application(s) residing in space 230 uses actual hard-coded transport buffer address(es), as well.

Figure 3:
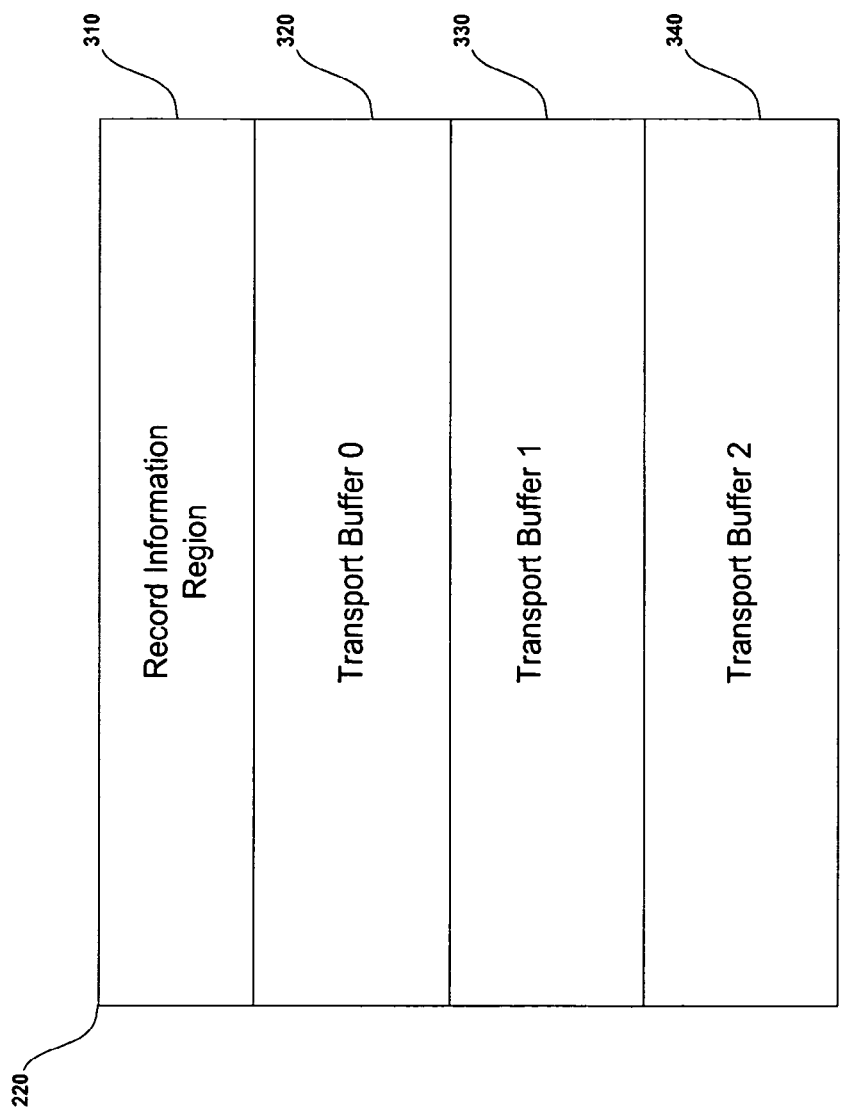
FIG. 3 is a block diagram of the memory allocation in a single buffer memory described herein.

FIG. 3 depicts a specific embodiment of memory allocation in single buffer memory 220, the single buffer shared asynchronously by both the record driver(s) and the record thread application(s). Memory 220 includes one record information region 310 and a transport buffer for at least each tuner in the system. In a preferred embodiment, a single transport buffer exists for each tuner in DVR 100. Depicted are Transport Buffer 0 320, Transport Buffer 1 330 and Transport Buffer 2 340, though more or fewer transport buffers may be used. In one embodiment, record information region 310 is one page of memory 4096 bytes in size and contains an array of structures where information regarding the position and size of the data written to each transport buffer by the record driver(s) is stored and updated by the record driver(s). The record thread application(s) may access these structures.

Figure 4:
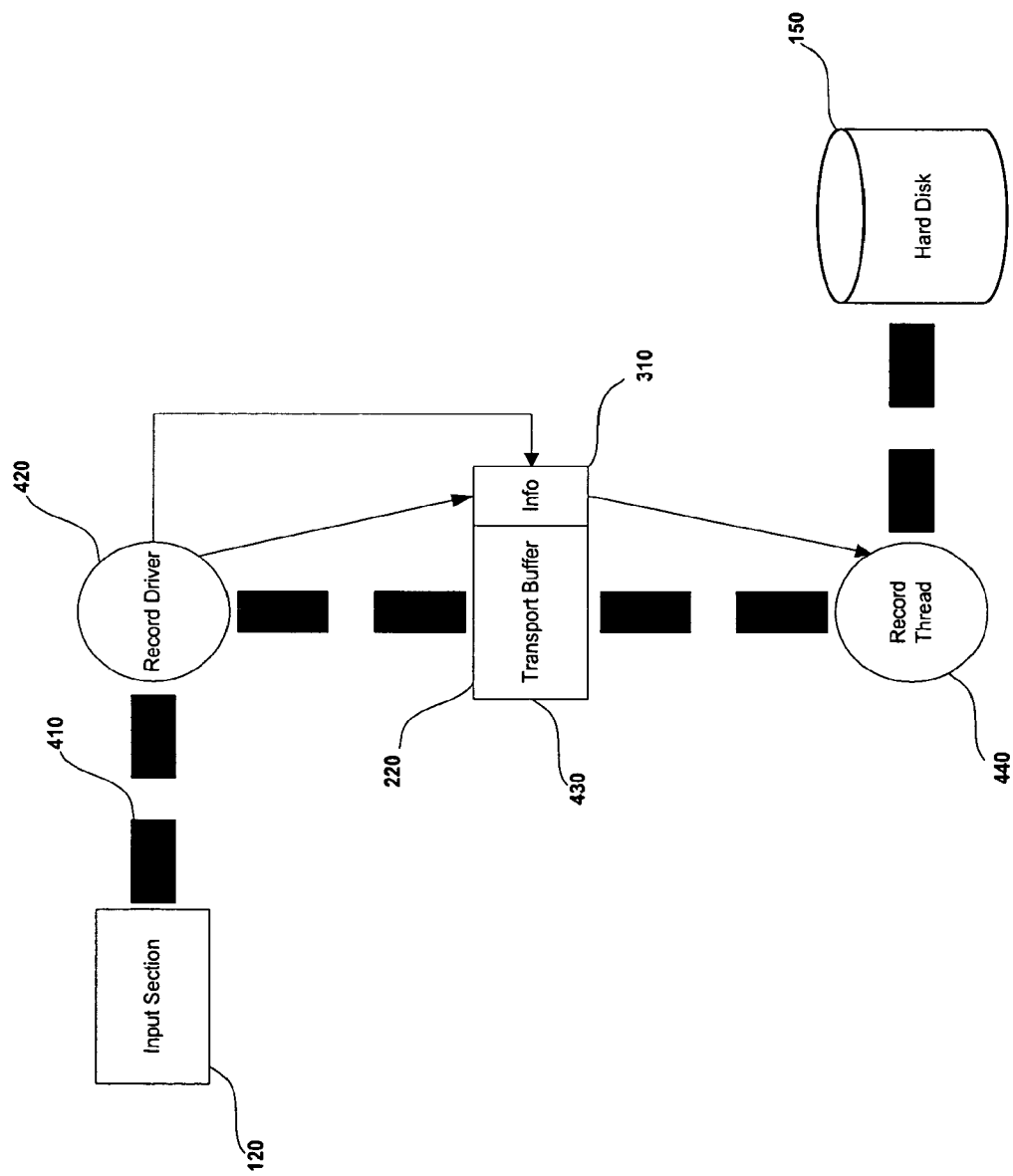
FIG. 4 is a flow diagram depicting the storage of data in a DVR system described herein.

FIG. 4 depicts handling of a transport stream intended for storage, in DVR 100. Transport stream data 410 received from input section 120 is written to transport buffer 430 of single memory buffer 220 by record driver 420. In an alternate embodiment, the data is moved into the transport buffer by the hardware of input section 120. Record driver 420 also updates information page 310 to indicate the position of the driver's record pointer. The record driver operates in real time as transport stream data is received from the input section without flow control.

Record thread application 440, which stores a last read position, accesses information page 310 to determine the size of un-written data in buffer 220. Record thread application 440 transfers the un-written data directly to hard disk 150 for storage as a TSP file.

Figure 5:
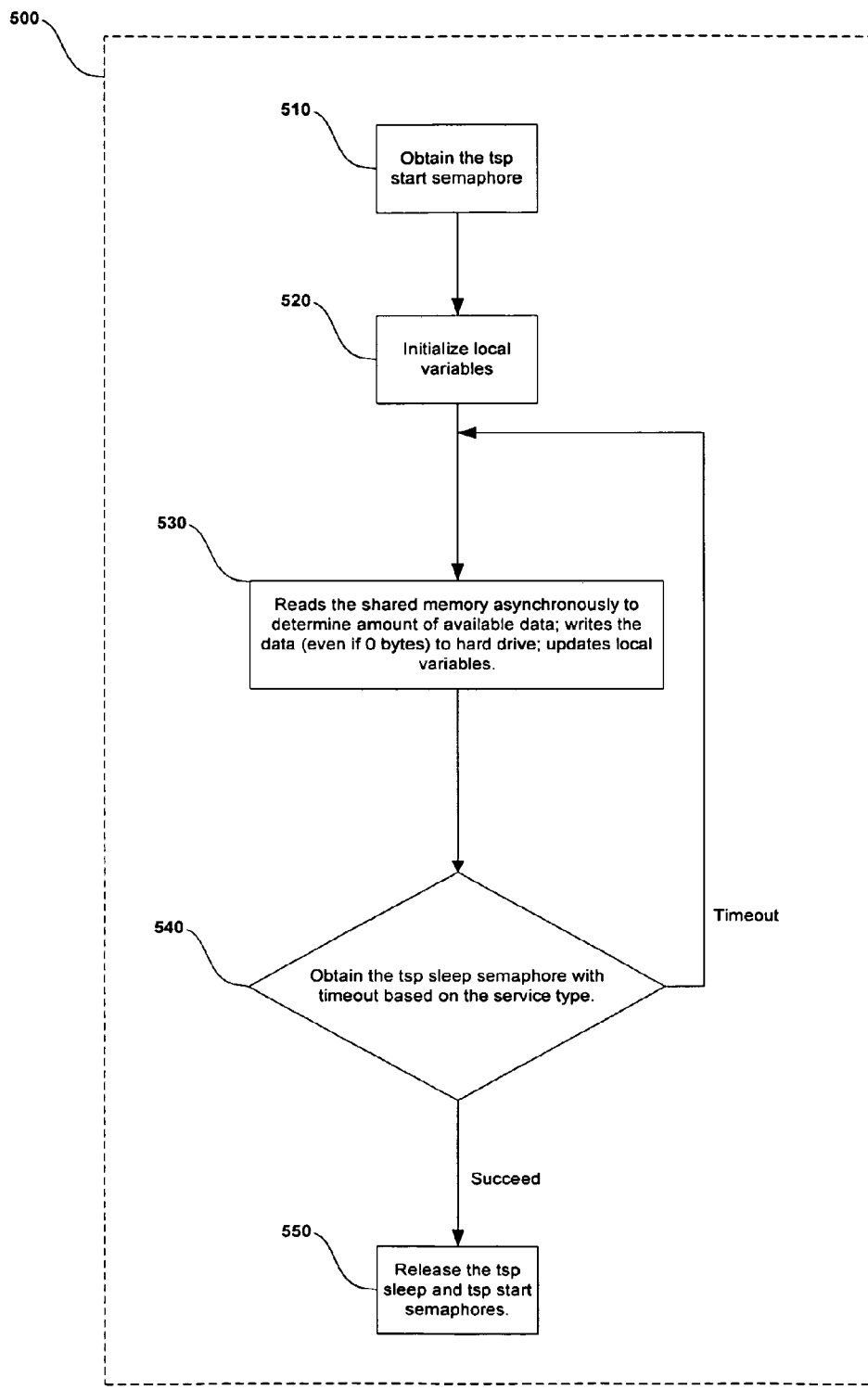
FIG. 5 is a logic diagram of the functions of a record thread application described herein.

FIG. 5 depicts a simplified flow diagram for one embodiment of a record thread application loop 500 operating on DVR 100. The record thread application sleeps on a "Start" semaphore until a master application signals the semaphore allowing the record thread to begin execution, process 510. Once the record thread executes, several local variables may be initialized and the execution loop is entered, process 520. In process 530, the execution loop reads the recording information structure associated with the transport buffer associated with the record thread application to determine how much unread data exists in the transport buffer and the location of that data. Also in process 530, this data is then written to hard disk 150, even if it is determined that zero bytes of data exist. The record thread application transfers the data to hard disk 150 via a direct IO (input/output) transfer, without processing the data through the record thread application. After being written to the hard disk 150, several local variables, such as last read address, may be updated, process 530. In process 540, the record thread may then go into an interruptible sleep, via a timed "Sleep" semaphore. The timeout period of the "Sleep" semaphore may be based on the service type, e.g., SD or HD television, or audio-only. This timed "Sleep" semaphore allows other processes in the system to run. If the "Sleep" semaphore times out, then the record thread executes another loop. If the master application has signaled the record thread to stop execution, then the semaphore does not time out, and the application terminates at process 550. The record thread application operates asynchronously with respect to the record driver. In alternate embodiments, the record thread application may be a record task or a record process application.

III. Presentation from Storage

DVR 100 accommodates several presentation modes for the stored video and audio data. In one embodiment, presentation modes include forward play, pause, reverse play, slow motion forward or rewind, fast forward or rewind, and skip forward or back. Using the methods and systems described herein, DVR 100 is able to accommodate these modes without using previously indexed MPEG frame information or the need for specific frame positioning or time sequence information. By avoiding the need to determine time sequence information for all stored video and/or audio data before recording and presentation from storage, system resources are conserved. In one embodiment, presentation from a storage device such as hard disk 150 is performed by reading portions of the stored MPEG transport stream to a read buffer prior to outputting to display section 130. In one embodiment, the read buffer is a circular read buffer. The presentation methods described herein may be employed with video-only data, audio-only data or combined video and audio data.

MPEG video compression standards reduce the amount of data required to transmit or store a video signal by representing certain frames of video as a delta from a previous or subsequent frame. MPEG video generally consists of three major frame types. I-frames, or intra-coded frames, are pictures encoded without referencing any other frame. P-frames, or predictive frames, are pictures encoded by referencing the delta from previous frames. B-frames, or bi-predictive frames, are pictures encoded by referencing the delta from previous and subsequent frames. MPEG-4 specifies an additional intra-coded frame type, the IRD-frame, which may also be used. It is understood that an IRD-frame may be substituted for an I-frame in the methods and systems described herein. To display a complete image, at least one intra-coded frame (I or IRD) must be decoded and presented. MPEG encoded video streams are broadcast in real time at a predetermined frame per second (fps) rate. The fps may vary depending on the content program. For example, the frame rate may be approximately 30 fps (standard television), 24 fps (movies), 25 fps (some foreign content), or other frame rate. MPEG standards may also be used for the compression of audio data into a frame format.

Presentation modes may be conceptually divided into three categories, as provided:

TABLE 1

| Linear (play) | forward |
| | slow motion forward |
| | pause |
| contiguous (trick) | rewind |
| | fast forward (certain speeds) |
| | fast rewind (certain speeds) |
| non-contiguous (trick) | fast forward (certain speeds) |
| | fast rewind (certain speeds) |
| | skip forward |
| | skip back |

Linear(play) is any presentation mode that displays every frame (I, P, and B) in sequential order. Forward mode, also referred to as "normal" play, which is presentation of all the video data at its broadcast fps rate, is a form of linear(play). The terminology "trick" is used to denote any presentation mode that requires either non-contiguous reading from the TSP file ("seeking") or display of fewer than the total number of picture frames ("skipping"). Contiguous(trick) is any trick mode that loads stored multimedia data contiguously. Non-contiguous(trick) is any trick mode that loads stored multimedia data non-contiguously. Other conceptual divisions of the presentation modes may be employed. In one embodiment, the presentation mode is selected by a user of DVR 100 through the use of a remote control device capable of facilitating user control of DVR 100.

Figure 6:
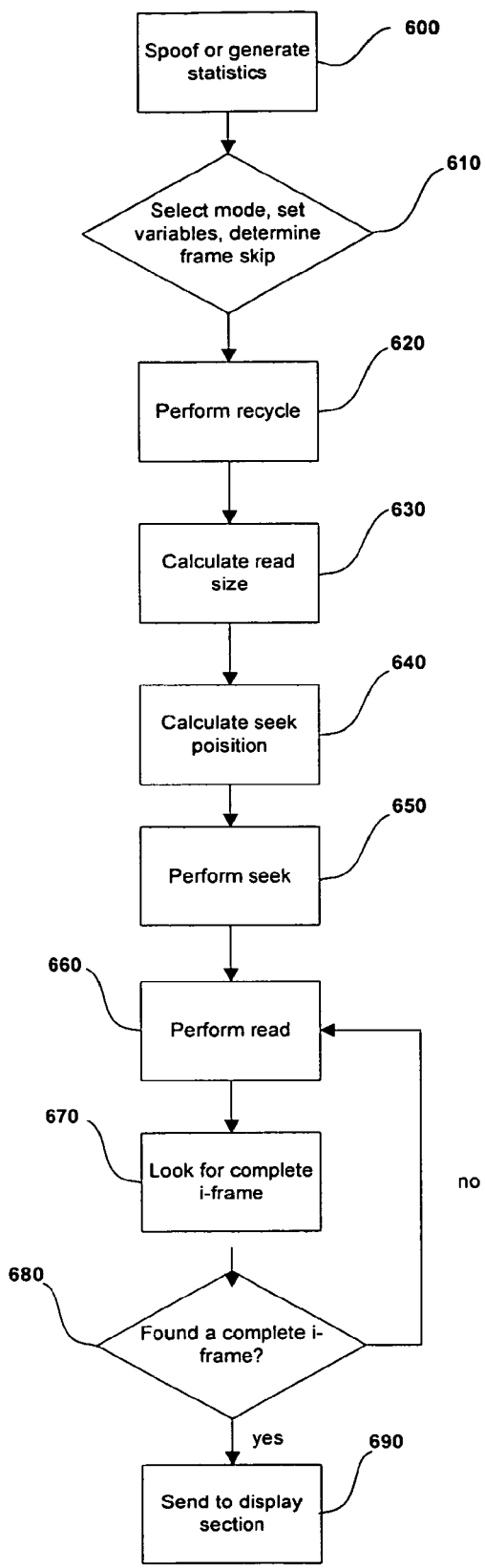
FIG. 6 is a logic diagram for presentation of stored data in a system described herein.

FIG. 6 depicts a simplified logic diagram of the steps involved in presentation once the user selects a change in the desired presentation mode, in a preferred embodiment using data stored as a TSP file. Depending on the presentation mode selected, statistical information regarding the video data encoded in an MPEG transport stream may be used to enable presentation without the need to exhaustively analyze the TSP file from the beginning to find the desired presentation location. In process 600, the statistical data is either "spoofed" (i.e., provided) using non-specific, pre-generated video data statistics or the statistical data is generated specifically during normal presentation of the content program. The following table presents video data statistical information that is spoofed or collected, in one embodiment:

TABLE 2

| Statistic: | Description: |
|---|---|
| total_num_frames | The total number of I, P, and B frames used in the statistics. |
| total_num_I_frames | The total number of I frames used in the statistics. |
| avg_frm_size | The average frame size taken from all frames encountered during playback. |
| I_spacing | The average integer number of frames from one I-frame to the next, also referred to as a group of pictures. |
| GOP_size | Average group of pictures size. Calculated as an I-frame spacing multiplied by average frame size. |
| Fps | Output frames per second. |

The information collected during normal presentation may or may not be stored in non-volatile memory for later use. In one embodiment, the information is maintained only for the duration of the current presentation session. In another embodiment, the statistical information may be contained in the transport stream, as broadcast. In an embodiment using statistical information broadcasted in the transport stream, the statistical information contained in the transport stream is private data contained in the adaptation field of a transport stream packet.

At process 610, the system selects the desired presentation mode and sets the number of frames to be skipped. In an embodiment employing a remote control device, user selection of a presentation mode is handled as a user input, from which DVR 100 determines the number of frames to skip. Skipping frames during presentation results in time-shifted display which a user perceives as accelerated display, expressed as multiples of the predetermined play rate (e.g., a presentation speed value). By way of example, if every 8th I-frame (Nth_I_frame) is displayed 2 times (M_repeats) and an I-frame occurs, on average, every 15th frame (I_spacing) in the content program, the user would perceive the presentation as "60×" (Speed) the normal rate. The perceived speed of presentation can be determined by the following formula:

$$\text{Speed} = (I\_spacing) * (Nth\_I\_frame) / (M\_repeats)$$

The product of (I_spacing) and (Nth_I_frame) determines the number of frames to skip, from the last frame presented for display. Generally, the statistical data from process 600 is used to provide (I_spacing). Alternatively, when the desired presentation mode dictates a single frame skipping event, the user perceives a "jump" or single skip forwards or backwards in an otherwise normal speed presentation.

Selecting the presentation mode may set a number of variable flags. In one embodiment, the flags set are TRUE/FALSE binary flags such as: "trick," "contiguous," and "forward." In an embodiment employing a remote control device, user seek input based on selection of a presentation mode is used to set the variable flags. The state of the flags may affect subsequent processing steps. In one embodiment, the "contiguous" flag is set as "TRUE" either if every frame is displayed (e.g., linear (play)) or if the number of frames to be skipped is fewer than or equal to (I_spacing). For example, display is "contiguous" when four frames are skipped and an I-frame occurs every 15th frame. In these instances, system efficiency may be optimized by loading data contiguously. Accordingly, certain presentation methods that skip frames will be considered contiguous, while other methods that also skip frames are designated as non-contiguous. Frames to be skipped can be expressed as a positive value if forward=TRUE and as a negative value if forward=FALSE.

At process 620, a recycle operation may be performed on the read buffer, depending on whether the contiguous flag is set. If a contiguous presentation mode is selected, stored data may be loaded contiguously. Accordingly, any portion of the read buffer that is resident but has not been forwarded to the display section (unused) can be recycled for potential use. Recycling conserves system resources by reducing the amount of file data to be read. If a non-contiguous presentation mode is selected, recycle process 620 does not occur and the unused data is cleared from memory or overwritten (flushed).

The size of stored MPEG transport stream file data to be read (read size) is determined at process 630. Read size is determined by the state of the contiguous flag. If the mode is contiguous, read size is equal to the maximum read buffer size minus the recycled data size. For non-contiguous modes, in one embodiment, the read size is twice the average group of picture size, as determined by process 600. Logically, there is a tradeoff in system efficiency between increasing the read size and the cost that would be incurred by an additional read event, if a complete I-frame cannot be located. By setting read size at twice the GOP size but less than the maximum buffer size, system resources are conserved while maintaining a high probability that a complete I-frame is loaded to the read buffer, while in a non-contiguous mode. Alternatively, the non-contiguous mode read size can be determined using the following formula, wherein Service_time is the time required to locate a complete I-frame, $P_{miss}(s)$ is the probability of not locating a complete I-frame and $t_{read}s$ is the time required to perform a read of size s:

$$(\text{Service\_time}) = (P_{miss}(s)+1)*(t_{read}s)$$

Once the curve for $P_{miss}(s)$ is either provided or determined empirically within DVR 100 (e.g., through sequential non-contiguous presentation events) the value of s can be dynamically adjusted to minimize Service_time.

Seek position is calculated at process 640. Seek position is determined relative to the current read position in the stored MPEG transport stream file. In one embodiment, the current read position is indicated by a file pointer. For presentation modes in which both the "forward" and "contiguous" flags were set to "TRUE" during process 610, no seeking should occur, as data loading will be performed contiguously. For contiguous rewind (i.e., contiguous=TRUE, forward=FALSE) in systems having a file pointer that only reads forward, seek position is the sum of the recycled data size and the read size determined at 630 (i.e., the maximum buffer size), so that data preceding the current file pointer position will have been placed into the read buffer, after the read event. For non-contiguous modes, a seek vector equal to the product of the frames to be skipped (set at 610), and the average frame size (determined at 600) is calculated. An adjustment equal to half of the GOP size is also determined to increase accuracy. Seek position is calculated based on the following formula, wherein (Origin) is the current file pointer position:

$$(\text{Seek\_position}) = (\text{Origin}) + (\text{Seek\_vector}) - \frac{(\text{GOP\_size})}{2}$$

At process 650, the file pointer seeks to the position determined at 640. A portion of the stored MPEG transport stream file equal to the read size determined at 630 is read into the read buffer, process 660.

At process 670, program logic analyzes the data in the read buffer to determine if a complete I-frame of data is present. In an MPEG transport stream, each packet may be optionally structured with an Adaptation Field. The Adaptation Field may contain transport stream state signaling, stream timing details, transport private data, and/or video splicing information. Transport private data contained within the Adaptation Field may contain access unit (AU) information. Access units are coded representations (e.g., I, B, and P frames) of a unit suitable for display (presentation unit), such as a video frame. Typically, access unit information signals whether an I-frame start is contained within the payload of the transport stream packet. Once an I-frame start is identified, locating another frame start further in the read buffer signals a complete I-frame. If access unit information is not available, program logic can analyze the transport stream payload for start code information, which may signal the start of a video frame. Data immediately following the start code indicates the video frame type (I, P, or B). As with access unit information, locating a subsequent video frame start code after identifying an I-frame start indicates the presence of a complete I-frame in the buffer. Generally, identification of I-frames through use of the Adaptation Field data is less system resource intensive than start code identification. However, start code information is always available while Adaptation Field information is optionally encoded. As described earlier, the Adaptation Field may also contain frame statistical information as private data. In one embodiment, start code identification is used only when Adaptation Field information is unavailable. In another embodiment, start code data is always used either independently or in conjunction with Adaptation Field information.

At decision 680, program logic determines whether additional data must be read. Preferably, DVR 100 is a system having a read buffer at least equal to the sum of the maximum group of pictures size and the maximum I-frame size. In such a preferred system, a complete I-frame will with a high probability be located in the read buffer during any contiguous play mode, as the maximum read buffer size is employed. In embodiments having a read buffer less than the sum of the maximum group of pictures size and the maximum I-frame size, it may be necessary to perform additional recycle processes, additional read processes, and/or to flush at least a portion of the read buffer to locate a complete I-frame. In non-contiguous mode, which does not recycle and reads less than the maximum read buffer size, an additional data read ("append") may be necessary if a complete I-frame of data is not located. An append occurs when the system loops to 660 and reads an additional portion of MPEG transport stream data from storage equal to the calculated read size and appends the new data to the data already loaded in the read buffer. Depending on the size of the read buffer, a flush of at least a portion of the read buffer may be necessary to allow for additional append operations in non-contiguous mode. Program logic will again analyze what the read buffer contains to determine if a complete I-frame is loaded, and if a complete I-frame is not loaded, will perform looping read and analyze processes until a complete I-frame is located.

Once a complete I-frame is located, it is forwarded to display section 130 at process 690 for decoding and display. Display section 130 is capable of outputting video and/or audio signals in a number of formats for presentation on a variety of display devices, such as a television set. In an embodiment wherein the broadcasted signal is an audio-only broadcasted signal, the display device may be a device capable of presenting only audio signals, such as a stereo system. DVR 100 may repeat the presentation process described as needed to create the desired presentation mode.

Using the methods disclosed herein, a DVR system may display MPEG transport stream encoded video and/or audio data in multiple presentation modes including at least normal speed, variable speed forward and reverse, and skip forward and reverse without having to linearly analyze the transport stream from the beginning to find the desired picture frame and without having to analyze and index video and/or audio frame information prior to storage of the transport stream.

While the present invention has been described with reference to certain preferred embodiments, those skilled in the art will recognize that various modifications and other embodiments may be provided. These and other embodiments are intended to fall within the scope of the present invention. These and other variations upon and modifications to the embodiment described herein are provided for by the present invention, which is limited only by the following claims.

What is claimed is:

1. A method for storing a stream of multimedia data, the method comprising:
   receiving the multimedia data into an input section of a multimedia receiver device that includes a processor;
   storing, by a software application executed in the processor, the multimedia data from the input section into a data buffer of the multimedia receiver device without interruption as the multimedia data is received into the input section, the data buffer having a fixed memory address within the memory; and
   transferring the currently available multimedia data from the data buffer directly to a data storage device; and
   delaying further transfer of multimedia data for a predetermined period of time that depends on a service type of the multimedia data;
   wherein the storing of the multimedia data in the data buffer occurs concurrently and asynchronously with the transferring of the multimedia data from the data buffer directly to the data storage device.

2. The method of claim 1, wherein:
   the transferring of the multimedia data from the data buffer to the data storage device is performed via a record application executed by a processor of the multimedia receiver device.

3. The method of claim 1, wherein:
   the storing of the multimedia data into the data buffer comprises updating a record information region comprising a location of the multimedia data stored in the data buffer and a size of the multimedia data stored in the data buffer.

4. The method of claim 3, wherein:
   the transferring of the multimedia data from the data buffer to the data storage device comprises:
      reading the record information region to determine the location of the multimedia data stored in the data buffer and the size of the multimedia data stored in the data buffer; and
      initiating a direct input/output transfer from the data buffer to the data storage device according to the location and size of the multimedia data stored in the data buffer.

5. The method of claim 4, wherein:
   the initiating of the direct input/output transfer occurs if the size of the multimedia data indicated in the record information region is at least zero.

6. The method of claim 4, wherein:
   the transferring of the multimedia data from the data buffer to the data storage device comprises:
      updating a local variable indicating the last position in the data buffer from which the multimedia data was transferred to the data storage device after execution of the direct input/output transfer.

7. The method of claim 1, wherein:
   the multimedia data is stored on the data storage device as a transport stream file.

8. A multimedia receiver device, comprising:
   an input section configured to receive the multimedia data from an external source;
   a data buffer configured to receive the multimedia data from the input section without interruption, and to at least temporarily buffer the multimedia data received from the input section;
   a data storage device configured to store the multimedia data from the data buffer;
   a processor configured to transfer the multimedia data from the data buffer directly to the data storage device while the multimedia data from the input section is being received into the data buffer; and
   a processor-accessible memory comprising the data buffer;
   wherein
      the data buffer is assigned a fixed memory address within the memory;
      the processor is configured execute an application to transfer the multimedia data currently available in the data buffer to the data storage device via a direct input/output transfer; and
      when executed by the processor, after transferring the multimedia data currently available in the data buffer to the data storage device, the application is configured to deactivate for a predetermined period of time that depends on a service type of the multimedia data.

9. The multimedia receiver device of claim 8, wherein:
   hardware of the input section is configured to transfer the multimedia data from the input section to the data buffer.

10. The multimedia receiver device of claim 8, wherein:
    the processor is configured to transfer the multimedia data from the input section to the data buffer via driver software.

11. A multimedia receiver device, comprising:
    an input section configured to receive the multimedia data from an external source;
    a data buffer configured to receive the multimedia data from the input section without interruption, and to at least temporarily buffer the multimedia data received from the input section;
    a data storage device configured to store the multimedia data from the data buffer;
    a processor configured to transfer the multimedia data from the data buffer directly to the data storage device while the multimedia data from the input section is being received into the data buffer; and
    a processor-accessible memory comprising the data buffer;
    wherein
       the data buffer is assigned a fixed memory address within the memory;
       the processor is configured execute an application to transfer the multimedia data currently available in the data buffer to the data storage device via a direct input/output transfer;
       when executed by the processor, after transferring the multimedia data currently available in the data buffer to the data storage device, the application is configured to deactivate for a predetermined period of time that depends on a service type of the multimedia data; and the service type of the multimedia data comprises one of standard-definition video data with audio data, high-definition video data with audio data, and audio-only data.

12. The multimedia receiver device of claim 8,
wherein the input section comprises multiple tuners, wherein each of the tuners is configured to receive a channel of the multimedia data;
wherein the memory comprises multiple data buffers, wherein each of the data buffers is configured to receive the multimedia data transferred from a corresponding one of the tuners; and
wherein the processor is configured to execute a plurality of applications, wherein each of the applications is configured to store the multimedia data from a corresponding one of the data buffers to the data storage device.

13. The multimedia receiver device of claim 12, wherein:
the memory comprises a record information region configured to store a location and a size for the multimedia data in each of the data buffers; and
each of the applications is configured to access the size and location of the multimedia data in its corresponding data buffer to transfer the multimedia data in its corresponding data buffer to the data storage device.

14. A digital video receiver device, comprising:
multiple tuners, wherein each of the tuners is configured to receive a channel of multimedia data;
a memory comprising multiple data buffers, wherein each of the data buffers is configured to receive and buffer the multimedia data from a corresponding one of the tuners in a data buffer that is assigned a fixed memory address within the memory;
a data storage device configured to store the multimedia data from the data buffers; and
a processor configured to execute multiple threads simultaneously, wherein each of the threads, when executed by the processor, is configured to transfer the multimedia data currently available from a corresponding one of the data buffers directly to the data storage device by way of a direct input/output transfer from the corresponding one of the data buffers to the data storage device while the multimedia data from the tuners is being received into the data buffers; and wherein each of the threads, when executed by the processor, is configured to deactivate for a predetermined period of time that depends on a service type of the multimedia data.

15. The digital video receiver device of claim 14, wherein:
the memory further comprises a record information region;
the record information region comprises information denoting the location of the multimedia data associated with each of the data buffers; and
each of the threads, when executed by the processor, is configured to read the information from the record information region applicable to its corresponding data buffer to initiate the direct input/output transfer.

16. The digital video receiver device of claim 14, wherein:
each of the data buffers is operated as a circular buffer; and
each of the threads, when executed by the processor, maintains a local variable indicating a location in its corresponding data buffer from where the next multimedia data is to be transferred into the data storage device.

* * * * *